July 23, 1935. J. GOGAN 2,009,316
MATERIAL TESTING DEVICE
Filed Feb. 3, 1933 2 Sheets-Sheet 1
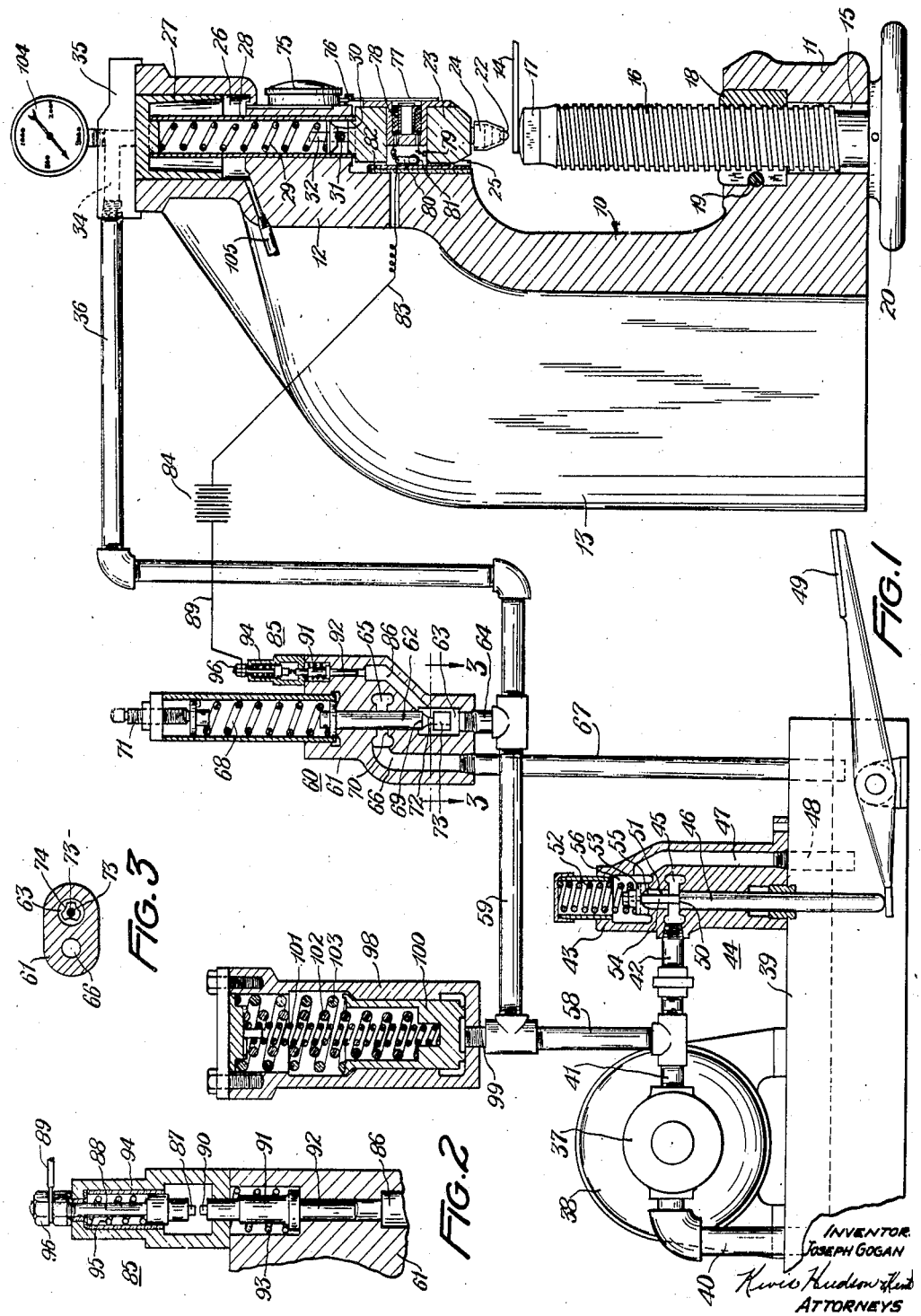
INVENTOR.
JOSEPH GOGAN
ATTORNEYS July 23, 1935.  J. GOGAN  2,009,316
MATERIAL TESTING DEVICE
Filed Feb. 3, 1933　　2 Sheets-Sheet 2

INVENTOR:
JOSEPH GOGAN
Kwis Hudson & Kent
ATTORNEYS

Patented July 23, 1935

2,009,316

UNITED STATES PATENT OFFICE 2,009,316

MATERIAL TESTING DEVICE

Joseph Gogan, Lakewood, Ohio

Application February 3, 1933, Serial No. 654,988

19 Claims. (Cl. 265—14)

This invention relates to means for testing the hardness, or other characteristics, of bodies by measuring the distortion produced by the application of a definite load and, as one of its objects, aims to provide a practical and improved form of such testing apparatus whereby individual bodies may be tested in rapid succession without destroying or impairing the utility of the bodies.

Another object of my invention is to provide improved testing apparatus, of the type referred to, having fluid pressure actuated means for applying force to a test piece to cause a contact member to distort the same, and means which prevents the pressure of the actuating fluid from exceeding a predetermined maximum value, and wherein means is provided for maintaining an operative connection between the fluid pressure actuated means and a distortion indicating device for all pressure values of the fluid between said predetermined maximum value and the pressure value of the fluid corresponding substantially with the initial application of force to the test piece.

A further object of my invention is to provide an improved testing device, of the type referred to, having a novel and simplified form of control for operating the device and also embodying novel means for obtaining the desired speed of actuation of the contact member.

It is also an object of my invention to provide testing apparatus, of the type referred to, wherein novel means is provided for releasably connecting the indicator actuating member with the contact member.

Other objects and advantages of the invention will be apparent from the following description when taken in conjunction with the accompanying drawings wherein, Fig. 1 is a sectional view of a preferred form of my testing device, the sectional view being taken substantially on a plane extending through the vertical center lines of the more important parts of the device.

Fig. 2 is a sectional view showing a part of the apparatus of Fig. 1 on an enlarged scale, the part shown being the contact means for energizing the electromagnet of the indicator actuating mechanism.

Fig. 3 is a transverse sectional view taken through the pressure control valve substantially as indicated by line 3—3 of Fig. 1.

Figure 5:
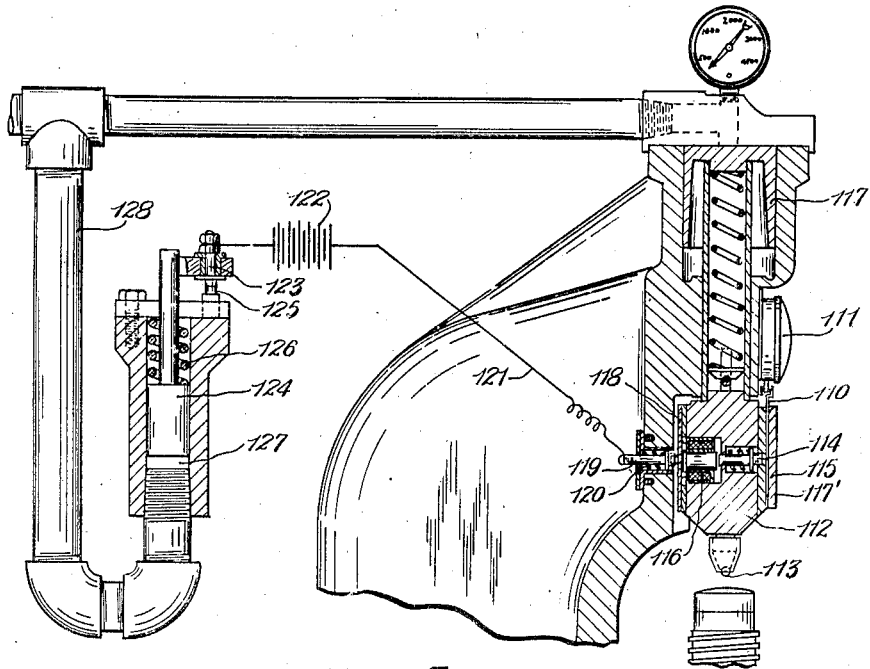
Figures 4, 6:
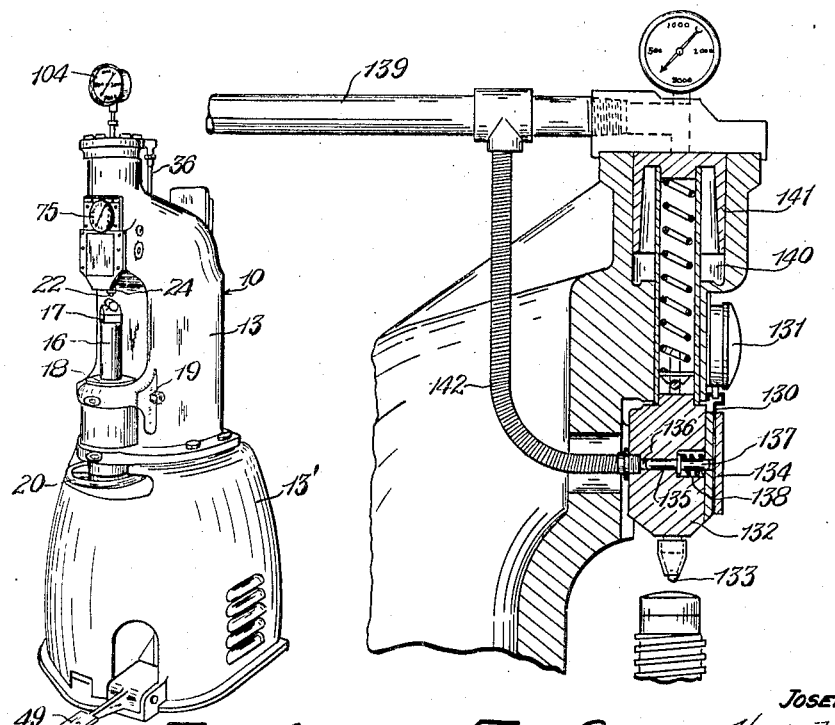
Fig. 4 is an elevational organization view showing a practical form of testing machine embodying the present invention.

Fig. 5 is a sectional elevation taken through another testing device which is constructed according to my invention, the sectional elevation being taken substantially on a plane extending through the vertical center line of the device and Fig. 6 is a sectional elevation taken through another testing device embodying my invention, the sectional elevation being taken substantially on a plane extending through the vertical center line of the device.

Detailed reference will now be made to the accompanying drawings wherein I have illustrated a simplified and commercially practical form of apparatus for the testing of the hardness and other characteristics of solid bodies, and which apparatus is an improvement over the testing machines disclosed in copending applications Serial No. 606,367, filed April 20, 1932 and Serial No. 612,245, filed May 19, 1932.

In the apparatus of the present application, as will be explained more fully hereinafter, I measure the distortion produced in a test piece by the application of a definite predetermined load thereto. For applying the predetermined load, I utilize a pressure fluid for causing the contact member to distort the test piece, and employ means for preventing the pressure of the fluid from exceeding the desired predetermined maximum value. In measuring the distortion produced in the test piece, I employ an indicator which is rendered responsive to movement of the contact member after the latter has moved through a portion of its stroke, means being provided for maintaining an operative connection between the indicator actuating member and the contact member for all pressures of the motive fluid between said predetermined maximum pressure and a preliminary pressure corresponding substantially to the pressure of the fluid at the time the contact member initially engages the piece being tested.

In the preferred form of my testing apparatus, as illustrated in Figs. 1 and 4 of the drawings, I show this apparatus as being provided with a suitable frame 10, which, in this instance, is a frame of the gap type although various other types of frames might be used. The frame 10 is provided with a laterally extending base portion 11, which constitutes a part of the work supporting means, and a head portion 12 disposed in spaced relation above the base portion 11. If desired, the strength of the frame may be increased by constructing the same with a pair of spaced rearwardly extending integral ribs or flanges 13. The frame 10 may be supported on any suitable form of mount, such as the bed 13' to which the frame may be bolted as shown in Fig. 4.

For supporting a piece of work, such as the test piece 14, in a desired position for making a test thereon, I provide the base portion 11 with an opening 15 in which an adjusting screw 16 is arranged so as to extend upwardly toward the head portion 12 of the frame. The upper end of this adjusting screw is provided with a mandrel or anvil 17 upon which the test piece 14 may be laid or held. The position of the mandrel or anvil may be varied relative to the head portion by means of the adjusting screw, and may be retained in any desired elevation by the clamping nut 18, through which the adjusting screw extends. This clamping nut may be in the form of a split nut which is non-rotatably mounted in a recess of the base portion 11 and which may be drawn into locking cooperation with the adjusting screw by means of a tangential clamping bolt 19. Rotation of the adjusting screw, for purposes of adjustment of the mandrel position, may be effected by hand wheel 20 which is pinned or otherwise connected to the lower end of the screw.

As mentioned above, I test the hardness or other characteristic of the body 14, by measuring the distortion produced therein by the application of a predetermined load and, in this instance, I show the distorting means as being a penetrator 22 which is carried by a holder 23 slidably mounted in the head portion 12 of the frame. The penetrator may be in the form of a hardened metal ball, such as the ball commonly used in making a Brinell hardness test, or may be a diamond point, or any other suitable form of contact member as determined by the character of the material being tested and the nature of the test being made. The contact member may be conveniently mounted on the holder 23 by providing the latter with a suitable chuck 24 in which the contact member may be releasably held.

The holder 23 is preferably mounted in the frame by providing the head portion 12 thereof with suitable spaced ways or guides 25 arranged so that the path of movement of the contact member 22 coincides substantially with the extended axis of the adjusting screw 16.

For actuating the contact member 22 to cause this member to engage and distort the test piece 14, I provide the head portion of the frame with a fluid pressure cylinder 26 in which the holder actuating piston 27 is reciprocably mounted. The holder 23 may be operably connected with the piston 27 by means of a hollow connecting rod or stem 28 extending therebetween and having its ends secured respectively to the holder and the piston. The piston and holder are normally retained in an elevated or retracted position, as shown in Fig. 1, by means of a coil spring 29 which may for convenience be arranged within the tubular connecting rod 28. The upper end of this spring engages the piston 27 and the lower end of the spring engages a stationary abutment 30 which may be held against displacement by means of a pin 31 extending through aligned slots 32 in the side wall of the tubular connecting rod 28.

The cylinder 26 is provided with a fluid pressure inlet opening 34 which is preferably located in the cylinder cover 35 and through which a suitable motive fluid, such as oil, may be supplied by means of pipe 36 for moving the piston 27 downwardly in opposition to the spring 29 and thereby causing the contact member 22 to move into engagement with and distort the test piece 14.

For supplying pressure fluid to the cylinder 26 through the pipe 36 for actuation of the contact member 22, I employ a suitable fluid pump 37 which, in this instance, is a pump of the rotary type and which may be directly connected to and driven by an electric motor 38. The pump 37 is preferably arranged near a reservoir 39, containing a quantity of the liquid being used as the motive fluid, and has a suction connection 40 for withdrawing liquid from the reservoir.

The fluid discharged by the pump is delivered through connections 41 and 42 to the casing 43 of a normally open control or by-pass valve 44. This by-pass valve may be of any suitable form of construction but is here shown as having a chamber 45, to which the pressure fluid is supplied from the pump connection, and a reciprocable plunger 46 constituting a valve element. When this valve element is in the position shown in Fig. 1 of the drawings the pressure fluid supplied to the chamber 45 passes substantially without restriction through the casing of the control valve and is returned to the reservoir through the passage 47 and the return pipe 48. When the valve element 46 is moved upwardly, as by depressing the foot lever 49, the shoulder 50 of the valve element enters the passage 51 leading from the chamber 45 and thereby completely closes the fluid passage through the valve casing. The valve element 46 is normally retained in the open position, shown in Fig. 1, by means of a coil spring 52 which engages a spring plate 53 mounted on an extension 54 of the valve element. As shown in the drawings, this spring plate is, preferably provided with grooves 55 in the under side thereof which overlie the passage 51 and normally permit fluid to flow from this passage into the spring chamber 56 and thence into the return passage 47. When the foot lever 49 is depressed, as when the operator desires to make a test, the by-pass valve 44 is closed and the fluid delivered by the pump is then forced through the piping 58, 59 and 36 to the cylinder 26 for actuation of the piston 27 therein.

Since the hardness or other characteristic of the body being tested is determined from a measurement of the distortion produced by the application of a definite predetermined load, it is necessary to impose and maintain such a definite load on the contact member 22 and I do this by preventing the pressure of the fluid, being supplied to the cylinder 26, from exceeding the desired predetermined value. For this purpose I employ a pressure regulating valve 60 which is in the nature of a by-pass valve. While various forms of pressure regulating valves may be employed for this purpose, I prefer to utilize a valve which will regulate the fluid pressure so that the stream of fluid, being supplied to the cylinder 26, will not be cut off or interrupted, and so that the maximum pressure of the fluid acting on the piston 27 will not exceed a desired predetermined value even though the pump 37 is capable of developing a fluid pressure in excess of this predetermined value.

In the drawings I have illustrated one form of pressure regulating valve which I have found to be very satisfactory in operation. This pressure regulating valve is provided with a casing 61 having a reciprocable plunger 62 therein constituting a movable valve element. The lower end of this valve element projects into a chamber 63 to which the fluid pressure delivered by the pump is admitted through a pipe connection 64. The movable valve element 62 also extends through a chamber 65 which communicates with the reservoir 39 through a return passage 66 and the return pipe 67. The pressure of the fluid being supplied to the cylinder 26 constantly acts on the lower end of the valve element 62 and, when this pressure builds up to substantially the desired predetermined value, the valve element is moved upwardly by the fluid pressure, in opposition to the spring 68, and when the shoulder 69 of the valve element moves upwardly past the wall 70 of the chamber 65 some of the pressure fluid being delivered by the pump flows into the chamber 65 and is returned to the reservoir through the passage 66 and the pipe 67.

The amount of fluid returned to the reservoir through the pressure relief valve is dependent upon the pressure of the fluid forced into the pipes 59 and 36 by the pump, and only so much fluid is returned to the reservoir as is necessary to prevent the pressure of the fluid being supplied to the cylinder 26, from exceeding the desired predetermined maximum value. This desired predetermined value for the fluid supply is selected by the operator in accordance with the nature of the material and the character of the test being made, or other factors, and the compression of the spring 68 is adjusted, by means of the screw 71, to attain this desired predetermined maximum pressure value.

Since the volume of fluid which is diverted back to the reservoir through the pressure regulating valve is a variable factor depending upon the extent to which the valve element 62 is opened, I find it desirable to construct this valve element so that chattering will be avoided and so that a smooth flow will be had through the valve regardless of the extent to which the valve is opened. I find that this smooth functioning of the pressure regulating valve is attainable when the movable valve element is provided with a tapered stem 72 extending axially away from the shoulder 69, as shown in Figure 1. This tapered stem causes the fluid being diverted through the pressure regulating valve to flow smoothly, and with minimum turbulence, from the chamber 63 into the chamber 65. The valve element is, preferably, also provided with a head portion 73 at the lower end of the tapered stem 72. This head portion is of substantially the same diameter as the body of the valve element 62 and is provided with circumferentially spaced axial recesses 74 which allow fluid to flow upwardly to the tapered stem portion 72 from the chamber 63 when the head portion 73 is forced upwardly out of the chamber 63.

For measuring the distortion produced in the test piece, in this instance the extent to which the contact member 22 is pressed into the test piece 14, I employ a gauge or indicator 75 which is preferably mounted on the frame 10 at a point above the holder 23. This indicator may be of any suitable construction but is preferably of the type having a pointer which is normally returned to a zero position by a spring contained in the casing of the indicator, and which pointer may be moved to indicate a reading, such as a reading in thousandths of an inch, by an actuating stem 76 projecting from the casing of the indicator.

In order that the indicator may respond to movement of the contact member 22 only during a portion of the stroke of the holder, I provide the gauge with an actuating member 77 which is connected with the stem 76 and which may be releasably connected for movement with the holder and the contact member, by means presently to be described. In providing for the releasable connection of the gauge actuating member 77 with the holder 23, the indicator can be rendered responsive to movement of the contact member 22 during a portion only of the stroke of the latter, so that in making a test, the contact member can be initially moved into engagement with the test piece at a rapid rate and without the indicator being responsive to such initial movement. Such rapid initial movement of the contact member into engagement with the test piece, is desirable because it contributes to the rapidity with which tests may be made with my improved apparatus.

To establish such releasable connection between the indicator actuating member 77 and the contact member 22, I construct the indicator actuating member of a magnetizable material, such as soft steel, and provide an electromagnet 78 which is preferably, although not necessarily, carried by the holder 23 and which when energized attracts the actuating member 77 and releasably connects the same for movement with the holder 23. One end of the winding of the electromagnet 78 is connected to the holder 23, as indicated at 79, and is thereby grounded. The other end of the winding of the electromagnet is connected to a movable conducting arm 80 having a contact roller 81 in engagement with a conducting strip 82, the latter being mounted on the frame 10 but insulated therefrom. The contact roller engages and follows the conducting strip 82 during movement of the holder 23 and thus provides a convenient means for connecting the magnet winding with an energizing conductor 83 which is connected to the conducting strip and to a source of suitable energizing current such as the battery 84.

In order that the indicator 75 may be automatically rendered responsive to movement of the contact member substantially instantaneously upon engagement of the latter with the test member 14, I provide a fluid pressure actuated device 85 for controlling the energization of the electromagnet 78. For convenience this fluid pressure actuating device may be associated with the pressure regulating valve 60 and may have a fluid passage 86 in communication with the pipe 59 through the chamber 63 of the fluid pressure regulating valve.

In the view of Fig. 2, which is on an enlarged scale, I show this control device as having an electric contact 87 carried by a terminal member 88, the latter being connected to the battery 84 by means of the conductor 89. This control device also includes an electric contact 90, which is carried by a terminal member 91, and is adapted to be moved into engagement with the contact 87. This terminal member is actuated by a plunger 92, which plunger may be an integral part of the terminal member and arranged to respond to fluid pressure transmitted through the passage 86. A coil spring 93 is disposed around the terminal member 91 and normally resists upward movement of the contact 90. The spring 93 and the plunger 92 are so proportioned that when the pressure of the fluid being supplied to the cylinder 26 increases, incident to the resistance which the test member offers to movement of the contact member 22, the terminal member 91 is moved upwardly to bring the contact 90 into engagement with the contact 87 to thereby close the energizing circuit for the electromagnet 78. The closing of the magnet circuit causes the indicator actuating member 77 to be connected to the holder 23 by magnetic attraction and the indicator is thereby rendered responsive to further movement of the contact member 22.

The terminal 88 of the control device 85 is suitably insulated from the casing 94 of this device so that the energizing circuit for the magnet 78 is established only when the contact 90 engages the contact 87. A coil spring 95 may be disposed around the terminal member 88 to normally maintain the latter in the position shown in Fig. 2, but to permit adjustment of the position of the contact 87 by means of the nuts 96.

I have found it desirable in testing apparatus of the type under consideration, that the contact member 22 move into the test piece at a relatively slow but substantially uniform rate of speed in order that an accurate test may be made. I have also found it to be desirable from the standpoint of accuracy to avoid having the contact member 22 initially strike the test piece while travelling at a rapid rate of speed. Accordingly, I provide means for slowing up the movement of the contact member 22, just prior to engagement of this member with the test piece, and also for obtaining a desired slow and uniform movement of the contact member into the test piece.

The means which I have found to be very efficient in accomplishing this speed controlling function is shown in this instance as comprising a cylinder 98 to which some of the fluid delivered by the pump 37 may be supplied through a pipe connection 99. A piston 100 is reciprocably mounted in the cylinder 98 and is normally held against movement by the fluid by means of the nested springs 101, 102 and 103. These nested springs and the piston 100 are so proportioned relative to each other and to the spring 29 and the piston 27, that when pressure fluid is initially supplied to the cylinder 26 upon actuation of the foot lever 49 by the operator, the nested springs resist movement of the piston 100 and substantially all of the fluid delivered by the pump flows into the cylinder 26. This flow of pressure fluid to the cylinder 26 causes an initial rapid movement of the contact member 22 toward the test piece 14. While the contact member 22 is being moved toward the test piece at this desired rapid rate of speed, the spring 29 is being compressed and the pressure of the fluid being supplied to the cylinder 26 is increasing. The nested springs and the piston 100 are so proportioned that the piston 100 begins to move in response to the pressure of the fluid existing just prior to engagement of the contact member 22 with the test piece. This movement of the piston 100 in the cylinder 98 utilizes some of the volume of fluid being discharged by the pump 37 and consequently reduces the rate of fluid supply to the cylinder 26 and thereby slows up the movement of the contact member 22 toward the test piece. As the pressure of the fluid continues to increase in moving the contact member 22 into engagement with, and into, the test piece, the piston 100 continues to move under the influence of the pressure fluid and the desired slow movement of the contact member 22 into the test piece is thus obtained. The nested springs acting on the piston 100, also provide a load resistance for the pump to act against and constitute a surge absorbing means, or pressure accumulator, which prevents undesirable fluctuations in the pressure of the fluid being supplied to the cylinder 26 so that the movement of the contact member 22 into the test piece takes place at a desired substantially uniform rate.

For a given relationship between the spring 29 and the springs 101, 102, 103, the distance of travel of the holder 23 at the desired rapid rate is substantially the same for a series of tests, and test pieces of varying sizes are accommodated to this substantially constant travel by vertical adjustment of the screw 16. If it should be desirable to change the distance of travel of the holder 23 at the above-mentioned rapid rate this can be readily done either by suitably adjusting the initial compression of the spring 29 and/or the springs 101, 102, 103, or by opening one or both of the cylinders 26 and 98 and substituting therein springs of a different resistance value.

As pointed out above, the electromagnet 78 is energized substantially upon engagement of the contact member 22 with a test piece and the indicator actuating member 77 is then connected with the holder 23 by magnetic attraction so that the indicator 75 measures the extent to which the contact member 22 is pressed into the piece 14. The contact 90 remains in engagement with the contact 87 as long as the pressure of the fluid acting on piston 27 exceeds the predetermined pressure value for which the plunger 92 and the spring 93 are designed to respond. In other words, the electromagnet remains energized so long as the contact 90 is held in engagement with the contact 87 by the fluid pressure.

Since the indicator 75 responds to and measures the movement of the contact member 22 into the test piece 14, the operator need only observe the reading of the indicator 75 to know whether or not the piece being tested is of the proper hardness. If the indicator indicates that the contact member 22 is pressed into the test piece more than a desired distance by the predetermined maximum pressure acting on the piston 27, the operator immediately knows that the piece being tested is too soft. If the indicator shows that the contact member 22 has not been pressed into the test piece the distance which it should be by the predetermined maximum pressure, the operator knows that the piece being tested is too hard.

If desired, a pressure gauge 104 may be mounted on the cylinder cover 35 to respond to the pressure of the fluid being supplied to the cylinder 26 to thereby provide a convenient means for visually checking the pressure of the fluid being supplied for actuation of the contact member 22. The operator of the machine may utilize the reading of the gauge 104 as a guide in the adjustment of the spring 68 of the pressure regulating valve 60.

Although in Fig. 1 of the drawings, illustrating a preferred form of my testing apparatus, I have shown the various devices, such as the motive fluids supply and pressure regulating means and the magnet energizing control, as being connected with the other parts of the machine only by means of the pipe 36 and the conductor 83, it should be understood however that in a practical form of the machine it may be desirable, from the standpoint of compactness, to mount these devices on the frame 10 preferably on the back thereof between the rearwardly extending ribs 13. If desired the cylinder 26 may be vented to atmosphere at a point below the piston 27, preferably by providing a combined drain and vent connection 105 leading from the cylinder to the reservoir 39.

In Fig. 5 of the drawings, I have shown another embodiment of my invention which is generally similar to the arrangement illustrated in Fig. 1, except that the actuating member 110 for the indicator 111 is normally connected to the holder 112 for the contact member 113, by means of a spring actuated locking pin or plunger 114, the latter being arranged to normally press the gauge actuating member 110 against an abutment member 115 carried by the holder. In other words, the plunger 114 is arranged to cooperate with the indicator actuating member 110 to normally connect this actuating member for movement with the contact member 113. An electromagnet 116, preferably carried by the holder 112, is arranged to move the plunger 114 in opposition to its spring to release the indicator actuating member from connection with the contact member 113. This electromagnet is normally energized to hold the plunger in retracted position, and is deenergized by control means responding to that pressure value of the fluid acting on the piston 117 substantially at the time the contact member 113 engages the test piece. The deenergization of the electromagnet releases the plunger 114 which then connects the indicator actuating member 110 for movement with the contact member 113, such connection being broken only when the magnet 116 is again energized.

The abutment member 115 may be formed as an integral part of the holder 112 or, as shown in the drawings, may be formed by attaching to the holder a block 117' having a slot or groove into which the indicator actuating member 110 slidably extends. For convenience of manufacture the block 117' may be formed of two suitably connected parts or plate members as shown in the drawings. This block is also provided with an opening which communicates with the slot to permit the plunger 114 to cooperate with the actuating member 110.

For controlling the energization of the electromagnet to accomplish the function just explained, I ground one end of the winding of the magnet by connecting the same to the holder 112 and connect the other end of the magnet winding to a conducting strip 118 which is carried by the holder but insulated therefrom. A contact member 119 is supported on the frame substantially opposite the electromagnet 116 and is normally pressed into engagement with the conducting strip by a spring 120. A conductor 121 connects the contact member 119 with a source of suitable energizing current, such as a storage battery 122. The other terminal of the battery is connected to a movable contact 123 which is carried by, but insulated from, a plunger 124. The contact 123 is arranged for engagement with a contact 125 and is normally held in contact with the latter by a spring 126 acting on the plunger 124. The plunger 124 is slidably mounted in a cylinder 127 which is connected with the pressure fluid supply means for the piston 117 by means of a pipe 128. The plunger 124 and the spring 126 are so proportioned that when the pressure of the fluid, being supplied for actuation of the piston 117, increases to the value corresponding with the engagement of the contact member 113 with the test piece, the contact 123 is moved away from the contact 125 to thereby open the circuit of the electromagnet 116. The deenergization of the magnet allows the plunger 114 to establish the operative connection between the indicator actuating member 110 and the contact member 113, so that the indicator 111 thereafter measures the extent to which the contact member 113 is pressed into the piece being tested.

In Fig. 6 of the drawings I have shown another arrangement of testing apparatus embodying my invention wherein the actuating member 130 for the indicator 131 is adapted to be releasably connected with the carrier 132 for the contact member 133 by fluid pressure actuated locking means. In this arrangement the elongated actuating member 130 extends into a slot or recess of the holder 132 so as to lie adjacent to an abutment member 134 carried by the holder. For convenience of manufacture the abutment member 134 may be formed of two suitably connected parts or plate members as shown in the drawings. The fluid pressure actuated locking means includes a plunger 135 which is movably mounted in a cylinder 136 formed, preferably, in the body of the holder 132. A locking pin 137 is arranged to be moved into engagement with the indicator actuating member 130 by plunger 135 so as to press the indicator actuating member against the abutment member 134 and thereby releasably connect the actuating member with the holder 132. A spring 138 normally holds the pin 137 out of engagement with the indicator actuating member so that the contact member 133 can be initially moved into engagement with a test piece without the indicator 131 responding to such initial movement.

The cylinder 136 is connected with the pipe 139, which supplies pressure fluid to the main cylinder 140 for actuation of the piston 141, this connection preferably being made by means of a flexible conduit 142 which permits the holder 132 to be moved without interfering with the transmission of fluid to the cylinder 136 from the pipe 139. The plunger 135 and the spring 138 are so proportioned that when the pressure of fluid, being supplied to the cylinder 140, reaches a predetermined value, such as the pressure value corresponding with the engagement of the contact member 133 with the test piece, the plunger 135 responds to the pressure fluid, thereby compressing the spring 138 and causing the pin 137 to frictionally clamp, or otherwise lock, the indicator actuating member 130 for movement with the contact member 133 so that the indicator 131 will indicate to the operator the extent to which the contact member 133 enters the piece being tested.

To avoid repetition in the drawings and in the description I have omitted the pressure fluid supply means from Figs. 5 and 6, but it should be understood that pressure fluid supply means as shown in Fig. 1 may also be employed for supplying pressure fluid to operate the devices shown in Figs. 5 and 6. That is to say, the pressure fluid supply means for the arrangements shown in Figs. 5 and 6 may include a pump 37 and by-pass valve 34 as shown in Fig. 1, as well as a pressure relief valve 60 and a speed regulating cylinder 98 as shown in Fig. 1.

From the foregoing description and the accompanying drawings, it should now be readily understood that I have provided a simplified and improved form of apparatus for testing the hardness, or other characteristics, of solid bodies wherein the measurement of the distortion produced in a test piece by the application of a predetermined load, is taken as a measurement of the hardness or other characteristic being determined. It will also be understood that in this improved apparatus the indicator is automatically rendered responsive to the movement of the contact member after the latter has moved through a portion of its stroke, and that such operative connection between the indicator actuating member and the contact member is maintained for all pressure values of the fluid in excess of that pressure value corresponding with the engagement of the contact member with the piece being tested. It will likewise be seen that in my improved testing apparatus the value of the distorting load is accurately determined by employing a pressure relief valve which prevents the pressure of the fluid, being supplied to the main cylinder, from exceeding a predetermined value and accomplishes this function without disconnecting the main cylinder from the pressure fluid supply means. As will also be understood from the drawings and foregoing description, my improved testing apparatus includes means for slowing up the movement of the contact member, just prior to engagement with the test piece, and for obtaining a relatively slow and substantially uniform speed of movement of the contact member while the latter is being pressed into the test piece.

By reason of the simplified apparatus which I have devised it is now possible for an inexperienced operator to rapidly and accurately test the hardness, or other characteristics, of individual bodies without destroying or impairing the utility of the bodies. Because of the rapidity and accuracy with which tests can be made with this apparatus, it is now commercially feasible to test each piece going into an assembled machine, from which it will be seen that my improved apparatus contributes directly to the more economical production of machinery, of superior quality, than has heretofore been possible.

While I have illustrated and described the testing apparatus of my invention in a detailed manner, it should be understood however, that I do not wish to be limited to the precise details of construction and arrangements of parts illustrated and described, but regard my invention as including such changes and modifications as do not involve a departure from the spirit of the invention and the scope of the appended claims.

Having thus described my invention, what I claim is:

1. In testing apparatus the combination of a supporting means, means movable relative to said supporting means, a contact member associated with one of said means for engagement with a test piece, means for actuating said movable means to cause said contact member to distort the test piece including a piston and a cylinder for said piston, means for measuring such distortion including an indicator and an indicator actuating member adapted for releasable connection with said movable means, a source of pressure fluid communicating with said cylinder, regulating means automatically operable in response to the pressure of the fluid, said regulating means being adapted to divert some of the fluid while said cylinder remains in continuous communication with said source to thereby prevent the pressure of the fluid from exceeding a desired maximum value, and means operable in response to a predetermined pressure value of the fluid for establishing an operative connection between the indicator actuating member and said movable means.

2. In testing apparatus the combination of a supporting means, means movable relative to said supporting means, a contact member associated with one of said means for engagement with a test piece, means for actuating said movable means to cause said contact member to distort the test piece including a piston and a cylinder for said piston, means for measuring such distortion, including an indicator and an indicator actuating member adapted for releasable connection with said movable means, a source of pressure fluid communicating with said cylinder, said source including a pump and a manually controlled normally open by-pass for diverting the pump delivery from said cylinder, and regulating means adapted to divert some of the fluid while said cylinder remains in continuous communication with said source to thereby prevent the pressure of the fluid from exceeding a desired maximum value, and means operable in response to a predetermined pressure value of the fluid for establishing an operative connection between the indicator actuating member and said movable means.

3. In testing apparatus the combination of a supporting means, means movable relative to said supporting means, a contact member associated with one of said means for engagement with a test piece, means for actuating said movable means to cause said contact member to distort the test piece including a piston and a cylinder for said piston, a source of pressure fluid, conduit means connecting said cylinder with said source, a pressure relief valve operable for preventing the pressure of the fluid being supplied to said cylinder from exceeding a predetermined maximum value, an indicator having an actuating member adapted for releasable connection with said movable means, and fluid pressure actuated means for establishing an operative connection between the indicator actuating member and said movable means, the last mentioned means being effective for maintaining such operative connection throughout the distorting of the test piece by the contact member.

4. In testing apparatus the combination of a supporting means, means movable relative to said supporting means, a contact member associated with one of said means for engagement with a test piece, means for actuating said movable means to cause said contact member to distort the test piece including a piston and a cylinder for said piston, a source of pressure fluid, conduit means connecting said cylinder with said source, a regulating valve automatically operable, while said cylinder remains in continuous communication with said source, for discharging some of said fluid to thereby prevent the pressure of the fluid being supplied to said cylinder from exceeding a predetermined maximum value, an indicator having an actuating member adapted to be releasably connected for movement with said movable means, and fluid pressure responsive means for establishing an operative connection between said indicator actuating member and said movable means, the last mentioned means being effective for maintaining such operative connection during the distorting of the test piece by the contact member.

5. In testing apparatus the combination of a supporting means, means movable relative to said supporting means, a contact member associated with one of said means for engagement with a test piece, means for actuating said movable means to cause said contact member to distort the test piece including a piston and a cylinder for said piston, a source of pressure fluid, conduit means connecting said cylinder with said source, a regulating valve automatically operable, while said cylinder remains in continuous communication with said source, for discharging some of said fluid to thereby prevent the pressure of the fluid being supplied to said cylinder from exceeding a predetermined maximum value, an indicator having an actuating member adapted to be releasably connected with said movable means by magnetic attraction, an electromagnet for causing such magnetic attraction, and means, including a magnet-energizing control responsive to a preliminary pressure value of the fluid, for maintaining an operative connection between the indicator actuating member and said movable means for all pressure values of the fluid between said preliminary pressure value and said predetermined maximum value.

6. In testing apparatus the combination of a contact member, a test piece support, means for actuating said contact member to cause the same to move into engagement with and distort a test piece including a piston and a cylinder for said piston, a source of pressure fluid, conduit means connecting said cylinder with said source, a spring arranged for cooperation with said piston to resist movement of the contact member toward the test piece, said piston and spring being such that the contact member is initially moved toward the test piece at a relatively rapid rate, a second cylinder having a piston therein against which the pressure fluid acts, a spring arranged to resist movement of the second mentioned piston, the piston and spring of the second cylinder being so proportioned relative to the piston and spring of the first mentioned cylinder that the second piston responds to the pressure of the fluid just before the contact member engages the test piece whereby the travel of the contact member is at a diminished rate of speed at the time it engages the test piece.

7. In testing apparatus the combination of a supporting means, means movable relative to said supporting means, a contact member associated with one of said means for engagement with a test piece, means for actuating said movable means to cause said contact member to distort the test piece including a piston and a cylinder for said piston, a pump for supplying pressure fluid to said cylinder, a normally open by-pass leading from the delivery side of the pump to the suction side thereof, a control valve for closing said by-pass, a fluid pressure responsive regulating valve adapted to divert some of the fluid being supplied to said cylinder to thereby prevent the pressure of the fluid from exceeding a predetermined value, a connection for returning to the suction side of the pump the fluid diverted by the regulating valve, an indicator having an actuating member adapted to be effectively connected with said movable means for movement proportionately therewith, and means, including a control responsive to a preliminary pressure value of the fluid, for establishing and maintaining an operative connection between said indicator actuating member and said movable means while the pressure of the fluid supplied to said cylinder is between said preliminary value and said predetermined maximum value.

8. In testing apparatus the combination of a supporting means, means movable relative to said supporting means, a contact member associated with one of said means for engagement with a test piece, means for actuating said movable means to cause said contact member to distort the test piece including a piston and a cylinder for said piston, a pump for supplying pressure fluid to said cylinder, a normally open by-pass leading from the delivery side of the pump to the suction side thereof, a control valve for closing said by-pass, a fluid pressure responsive relief valve for preventing the pressure of the fluid being supplied to said cylinder from exceeding a predetermined value, a connection for returning to the suction side of the pump the fluid diverted by the relief valve, an indicator having an actuating member adapted to be effectively connected with said movable means by magnetic attraction, an electromagnet for causing such magnetic attraction, and means, including a magnet-energizing control responsive to a preliminary pressure value of the fluid, for maintaining an operative connection between the indicator actuating member and said movable means for all pressure values of the fluid between said preliminary pressure value and said predetermined maximum value.

9. In testing apparatus the combination of a supporting means, means movable relative to said supporting means, a contact member associated with one of said means for engagement with a test piece, means for actuating said movable means to cause said contact member to distort the test piece including a piston and a cylinder for said piston, means for supplying pressure fluid to said cylinder, an indicator having an actuating member, means for rendering said indicator actuating member responsive to movement of said movable means during a portion of the stroke of the latter, such rendering means comprising a cylinder carried by said movable means, a piston in said cylinder, means adapted to be operated by the last mentioned piston for releasably locking the indicator actuating member with said movable means, and means for supplying pressure fluid to the last mentioned cylinder.

10. In testing apparatus the combination of a supporting means, means movable relative to said supporting means, a contact member associated with one of said means for engagement with a test piece, means for actuating said movable means to cause said contact member to distort the test piece including a piston and a cylinder for said piston, means for supplying pressure fluid to said cylinder, an indicator having an actuating member, means for rendering said indicator actuating member responsive to movement of said movable means during a portion of the stroke of the latter, such rendering means comprising a cylinder carried by said movable means, a piston in said cylinder, means adapted to be operated by the last mentioned piston for releasably locking the indicator actuating member with said movable means, and means including a flexible conduit for supplying pressure fluid to the last mentioned cylinder.

11. In testing apparatus the combination of a contact member adapted to engage and distort a test piece, a movable holder for said contact member, actuating means for said holder including a piston operatively connected with the holder and a cylinder for the piston, means for supplying pressure fluid to said cylinder, an indicator having an actuating member, means for rendering said indicator actuating member responsive to movement of said contact member during a portion of its stroke, the last mentioned means comprising a cylinder carried by said holder, a piston in said cylinder, means adapted to be operated by the last mentioned piston for releasably locking the indicator actuating member with said holder, means normally resisting actuation of said locking means, and means for supplying pressure fluid to the last mentioned cylinder, said last mentioned piston and said resisting means being such that the locking means is actuated upon an increase in the fluid pressure incident to engagement of the contact member with the test piece.

12. In testing apparatus the combination of a supporting means, means movable relative to said supporting means, a contact member associated with one of said means for engagement with a test piece, means for actuating said movable means to cause said contact member to distort the test piece including a piston and a cylinder for said piston, means for supplying pressure fluid to said cylinder, a pressure relief valve operable for preventing the pressure of the fluid being supplied to said cylinder from exceeding a predetermined value, an indicator having an actuating member, and means for rendering said indicator actuating member responsive to movement of said movable means during a portion of the stroke of the latter, such rendering means comprising means arranged for releasably locking the indicator actuating member with said movable means and adapted to be actuated by a preliminary pressure value of said fluid whereby an operative connection is maintained between the indicator actuating member and the movable means for all pressure values of the fluid between said preliminary value and said predetermined value.

13. In testing apparatus the combination of a supporting means, means movable relative to said supporting means, a contact member associated with one of said means for engagement with a test piece, means for actuating said movable means to produce relative movement between said supporting means and said movable means in a direction to cause said contact member to distort the test piece including a piston and a cylinder for the piston, means for supplying pressure fluid to said cylinder, a pressure relief valve operable for preventing the pressure of the fluid from exceeding a predetermined value, an indicator having an actuating member, and means responsive to a preliminary pressure value of the fluid for effectively connecting said actuating member with said movable means, such connecting means including means adapted to clampingly cooperate with said actuating member and means for rendering the clamping means effective for all pressure values of the fluid between said preliminary pressure value and said predetermined maximum value.

14. In testing apparatus of the character described the combination of a test piece support, a test member movable relative to said support for engagement with a test piece, means for applying a force to said movable member to distort said test piece, an indicator having a movable control element, frictional means for rendering said control element responsive to movement of said test member, and an electromagnet for rendering the last mentioned means ineffective.

15. In testing apparatus of the character described the combination of a test piece support, a test member movable relative to said support for engagement with a test piece, means for applying a force to said movable member to distort said test piece, an indicator having a movable control element, means including a movable member adapted to be pressed against said control element for rendering the control element responsive to movement of said test member, an electromagnet for actuating said movable member to release said control element, and means for energizing said electromagnet.

16. In testing apparatus of the character described the combination of a test piece support, a test member movable relative to said support for engagement with a test piece, means for actuating said test member including a piston and a cylinder for said piston, means for supplying motive fluid to said cylinder for initially moving said test member into engagement with the test piece and for subsequently distorting the test piece, an indicator, a movable control for said indicator, means for rendering said control responsive to movement of said test member, an electromagnet for rendering the last mentioned means ineffective, a circuit for energizing said electromagnet, and means effective substantially upon engagement of said test member with said test piece for opening said circuit.

17. In testing apparatus of the character described the combination of a test piece support, a test member movable relative to said support for engagement with a test piece, means for applying force to said test member to move the same into engagement with and to distort a test piece, an indicator having a movable actuating member, means tending to establish an operative connection between the indicator actuating member and the test member, and means for preventing such operative connection being established during that movement of the test member prior to the engagement of the test piece by the test member.

18. In testing apparatus of the character described the combination of a test piece support, a test member movable relative to said support for engagement with a test piece, means for applying force to said test member to move the same into engagement with and to distort a test piece, an indicator having a movable actuating member, means including a spring pressed member biased in a direction to establish an operative connection between the indicator actuating member and the test member, and means for preventing said spring pressed member from establishing such operative connection prior to engagement of the test piece by the test member.

19. In testing apparatus of the character described the combination of a test piece support, a test member, a movable holder for the test member, means for actuating said holder to move the test member into engagement with and to distort a test piece, an indicator having an actuating member, and means carried by said holder for releasably connecting the indicator actuating member with said holder, the last mentioned means comprising a shiftable member, a spring biasing said shiftable member in a direction to establish a connection between the indicator actuating member and the holder, and means for moving said shiftable member in opposition to the spring to prevent connection of the indicator actuating member with the holder prior to engagement of the test member with the test piece.

JOSEPH GOGAN.